US011134680B2

(12) United States Patent
Linke et al.

(10) Patent No.: US 11,134,680 B2
(45) Date of Patent: Oct. 5, 2021

(54) DISINFECTANT HAVING ORGANIC ACIDS

(71) Applicant: Bode Chemie GmbH, Hamburg (DE)

(72) Inventors: Christoph Linke, Hamburg (DE);
Herta Gerdes, Hamburg (DE)

(73) Assignee: BODE CHEMIE GMBH, Hamburg (DE)

( * ) Notice: Subject to any disclaimer, the term of this patent is extended or adjusted under 35 U.S.C. 154(b) by 0 days.

(21) Appl. No.: 15/751,974

(22) PCT Filed: Aug. 11, 2016

(86) PCT No.: PCT/EP2016/069115
§ 371 (c)(1),
(2) Date: Feb. 12, 2018

(87) PCT Pub. No.: WO2017/029183
PCT Pub. Date: Feb. 23, 2017

(65) Prior Publication Data
US 2018/0235218 A1 Aug. 23, 2018

(30) Foreign Application Priority Data

Aug. 18, 2015 (DE) ...................... 10 2015 113 641.4

(51) Int. Cl.
A01N 37/02 (2006.01)
A01N 37/10 (2006.01)
A01N 37/36 (2006.01)

(52) U.S. Cl.
CPC ............ A01N 37/02 (2013.01); A01N 37/10 (2013.01); A01N 37/36 (2013.01); A01N 2300/00 (2013.01)

(58) Field of Classification Search
CPC ........ A01N 37/02; A01N 37/36; A01N 37/10; A01N 2300/00
See application file for complete search history.

(56) References Cited

U.S. PATENT DOCUMENTS

| 8,465,766 | B2 | 6/2013 | Krug | |
| 8,557,265 | B2 | 10/2013 | Krug | |
| 8,999,399 | B2 | 4/2015 | Lisowsky | |
| 9,185,908 | B2 | 11/2015 | Krug | |
| 9,426,981 | B2 | 8/2016 | Hurtmanns | |
| 2004/0043922 | A1* | 3/2004 | Naidu | A23L 3/3571 426/326 |
| 2011/0028550 | A1 | 2/2011 | Campano | |
| 2012/0252893 | A1 | 10/2012 | Pimentel | |
| 2013/0209629 | A1* | 8/2013 | Berndt Briceno | A23B 7/157 426/240 |
| 2014/0377407 | A1* | 12/2014 | Parenicova | A21D 8/042 426/20 |
| 2014/0378333 | A1* | 12/2014 | Walt | C12Q 1/6876 506/9 |

FOREIGN PATENT DOCUMENTS

| DE | 197 10 127 | 9/1998 |
| EP | 1 110 452 | 6/2001 |
| EP | 0 588 912 | 4/2003 |
| WO | WO 98/53681 | 12/1998 |
| WO | WO 2009/155931 | 12/2009 |
| WO | WO 2012/061920 | 5/2012 |
| WO | WO 2014/100204 | 6/2014 |
| WO | WO 2014100204 A1 * | 6/2014 |
| WO | WO 2015/036433 | 3/2015 |

OTHER PUBLICATIONS

White et al. ("Honey Composition and Properties" in Beekeeping in the United States Agricultural Handbook No. 334, 1980, pp. 1-11).*
Mato et al. ("Significance of Nonaromatic Organic acids in Honey," in Journal of Food Protection, vol. 66, No. 12, 2003, pp. 2371-2376).*
Badawy et al. ("Antibacterial activity of bee honey and its therapeutic usefulness against Escherichia coli O157:H7 and Salmonella typhimurium infection," in Rev. Sci. tech. Off. Int. Epiz., 2004, 23 (3),1011-1022).*
Murphy et al. "Combining Organic Acid Treatment with Steam Pasteurization To Eliminate Listeria monocytogenes on Fully Cooked Frankfurters" in Journal of Food Protection, vol. 69, No. 1, 2006, pp. 47-52.*
Doyle, Food Research Institute, UW-Madison, "Literature Survey of teh Various Techniques Used in Listeria Interventio" pp. 1-39, Oct. 1999.*
PCT International Search Report and Written Opinion, dated Oct. 6, 2016, issued in parallel PCT International application PCT/EP2016/069115, 13 pages.
Kramer et al., WallhauBers Praxis der Sterilisation. Desinfektion, Antiseptik und Konservierung, 2008, cover pages, and pp. 693-715.
S. Block, Disinfection, Sterilisation and Preservation, 4th edition, ISBN 0-8121-1364-0, 1991, cover pages, and pp. 807-810.
Murphy et al., "Combining Organic Acid Treatment with Steam Pasteurization . . . " J. Food Protection, vol. 69, No. 1, 2006, pp. 47-52.

* cited by examiner

Primary Examiner — Blessing M Fubara

(74) Attorney, Agent, or Firm — Greenblum & Bernstein, P.L.C.

(57) ABSTRACT

The invention relates to an aqueous disinfectant for disinfecting inanimate surfaces, a concentrate for producing the application solution, and the use of the disinfectant to eliminate microorganisms. The combination of a plurality of organic acids according to the invention is, surprisingly, a synergistic composition and enables adequate germicidal action. Surprisingly, adequate microbicidal effectiveness against a broad spectrum of microorganisms can thereby be achieved in a short exposure time without further active ingredients.

22 Claims, No Drawings

DISINFECTANT HAVING ORGANIC ACIDS

The invention relates to an aqueous disinfectant for the disinfection of inanimate surfaces, to a concentrate for the preparation of the disinfectant and to the use of the disinfectant for the elimination of microorganisms.

Disinfectants for inanimate surfaces must meet a multitude of requirements. Firstly, it is important that they exhibit a good antimicrobial efficacy; secondly, they must not attack the materials on which the disinfection takes place. Moreover, the health aspect of active disinfection ingredients has become increasingly important over recent years.

Potent active ingredients having a broad activity spectrum, such as quaternary ammonium compounds, aldehydes, oxygen-releasing agents as well as amines, have become discredited because of their potential hazard to the user und represent a not inconsiderable hazard to humans in the event of an excess dose.

One option for toxicologically safe active disinfectant ingredients are organic acids. Organic acids are mid-strength to weak carboxylic acids having at least one carboxyl group. In the food processing industry, selected organic acids and salts have gained acceptance for the unproblematic preservation of foodstuffs, partly because a multitude of organic acids is of natural origin.

Besides the antimicrobial action, further possible applications for organic acids are use as pH regulators or additives in, inter alia, disinfectant compositions and antiseptics. What are used are both the free acid form and the corresponding salt, it being self-evident to a person skilled in the art that both can be converted into each other.

Individual organic acids exhibit weak, antimicrobial efficacies in the form of inhibitions of growth on specific bacteria, according to Wallhäußer (Wallhäußers Praxis der Sterilisation, Desinfektion, Antiseptik und Konservierung [Wallhäußer's practical sterilization, disinfection, antisepsis and preservation]; Qualitätssicherung der Hygiene in Industrie, Pharmazie and Medizin [Hygiene quality assurance in industry, pharmacy and medicine]; Kramer, Axel; Assadian, Ojan; 2008 Georg Thieme Verlag KG; ISBN 978-3-13-141121-1; pages 693-694 (acetic acid); pages 695-696 (lactic acid)). For instance, the minimum inhibitory concentration (MIC) is of 9% acetic acid on *Staphylococcus aureus* with an exposure time of 72 hours and is therefore suitable as preservative and additive in foodstuffs. Furthermore, lactic acid at a concentration of 0.3% exhibits a reduction factor >5 log on *S. aureus* after an exposure time of 72 hours. However, these do not concern comprehensive evidence of antibacterial efficacy, but instead specific individual efficacies. Moreover, high concentrations and/or long exposure times are described, which make use of organic acids as sole active disinfection ingredients appear uneconomical and impracticable. As a result, there are to date no products on the market for surface disinfection that are based exclusively on organic acids and achieve an effective reduction of bacteria, yeasts and, optionally, mycobacteria within economical times.

WO 2009/155931 A1 discloses an antimicrobial composition containing acetic acid. The composition is used for the cleaning of industrial or medical equipment. A good antibacterial efficacy is described. An efficacy against other microorganisms is not disclosed.

WO 2015/036433 A1 discloses an antimicrobial composition containing organic acids. The composition comprises (a) a C6-C12 fatty acid and (b) a mixture of propionic acid and lactic acid. The ratio of (b) to (a) must be at least 8. A good antibacterial efficacy is described. An efficacy against *Candida albicans* or mycobacteria is not disclosed.

EP 0 588 912 B1 describes an antimicrobial alcoholic composition composed of: (a) 0.05% by weight to 80% by weight of sorbic acid, (b) 0.05% by weight to 80% by weight of benzoic acid and (c) 0.5% by weight to 5% by weight of lactic acid or propionic acid, the carrier comprising 5% by weight to 40% by weight of ethanol. This alcohol-containing formulation is used as sanitizer, for example in combination with surfactants in cleaners, in hand creams or for the disinfection of surfaces.

It is therefore an object of the present invention to provide a disinfectant for inanimate surfaces, which disinfectant has a sufficient antimicrobial efficacy even with short exposure times at low concentrations in the application solution and is harmless to the user. The disinfectant must exhibit efficacy in the absence of elevated temperatures, coupled with simultaneous efficacy against yeasts, such as *Candida albicans*, and bacteria, such as *Staphylococcus aureus*, optionally mycobacteria, such as *Mycobacterium terrae*. Moreover, it is intended that the disinfectant manage without toxicologically unsafe active ingredients. In addition, it is intended that the disinfectant exhibit a good material compatibility.

According to the invention, the object is achieved by a disinfectant for the disinfection of inanimate surfaces, containing
   0.1-10% by weight of at least three organic acids or the salts thereof selected from the group consisting of acetic acid, propionic acid, tartaric acid, benzoic acid and lactic acid,
   a solvent, preferably water, and
   optionally solubilizers selected from glycols, glycol ethers or a mixture thereof,
wherein the specified amounts are based in each case on the total amount of the application solution.

Further embodiments are subject matter of the dependent claims or described below.

Here, an antimicrobial composition in the context of the invention is a composition which achieves at least a log 4 reduction with respect to *Candida albicans* and a log 5 reduction with respect to *Staphylococcus aureus* in accordance with the "Standardmethoden der DGHM zur Prüfung chemischer Desinfektionsverfahren" [Standard methods of the German Society for Hygiene and Microbiology for testing chemical disinfection methods] (version of 1 Sep. 2001) in the quantitative suspension test. Particularly suitable antimicrobial compositions in the context of the invention are those which bring about additionally at least a log 4 reduction with respect to *Mycobacterium terrae*.

Inanimate surfaces are understood by a person skilled in the art to mean those which by nature are not colonized by bacteria. Typical inanimate surfaces are floors, medical instruments, such as monitoring screens, but also areas in the proximity of patients, such as examination tables, bedside tables and storage shelves. This is in contrast to animate surfaces, such as hands and skin, in the case of which efficacy as well as harmlessness for use on humans is of great importance. Consequently, disinfectants for inanimate surfaces must exhibit a good material compatibility toward, inter alia, sensitive plastics, polymers and metals. The frequency and the extent of the disinfection of inanimate surfaces are dependent on the risk potential. The Robert Koch Institute (RKI) makes a distinction between routine, daily disinfection on a hospital bed and specific surface disinfection in particular situations.

Preferably, the disinfectant according to the invention does not contain organic acids apart from acetic acid, lactic acid, propionic acid, tartaric acid, benzoic acid or mixtures thereof. It is also possible to use the sodium and potassium salts of the acids in order to buffer the pH of the solution. Preference is given here to sodium acetate and sodium benzoate. Particularly preferably, the disinfectant according to the invention contains a combination selected from acetic acid, propionic acid, lactic acid, tartaric acid and sodium benzoate and, more particularly, no sorbic acid and no C6-C12 fatty acids are present.

Unless specified otherwise, all the concentrations specified for the organic acids are based in each case on 100% acid. Preferably, according to the invention, the preparation of the disinfectant compositions uses commercially available 90% lactic acid, 99% propionic acid, 99% (+)-tartaric acid, 99% sodium benzoate and 100% acetic acid.

Instead of the free acid, the salt of an organic acid can also be added to the disinfectant composition. This has the advantage that the pH can be regulated without further pH regulators. Moreover, there is the option of adding a strong acid, for example hydrochloric acid or sulfuric acid, to produce the free acid from a salt.

In the disinfectant according to the invention, the individual components, if present, are preferably present in the following amounts.
Lactic acid 0.05-3% by weight, preferably 0.5-1.5% by weight
Tartaric acid 0.1-2% by weight, 0.5-1% by weight
Acetic acid 0.1-5% by weight, 0.5-3% by weight
Propionic acid 0.1-5% by weight, 0.5-3% by weight
Sodium benzoate 0.1-2% by weight, 0.1-1% by weight
Sodium acetate 0.1-5% by weight, 0.2-1% by weight
Propylene glycol 0.1-3% by weight, 0.2-1% by weight
Hexyl carbitol 0.1-3% by weight, 0.2-1% by weight The disinfectant according to the invention is preferably present as a ready-to-use, aqueous solution for disinfection (application solution). The application solution is prepared by dilution of a disinfectant concentrate according to the invention with water. In this case, the disinfectant according to the invention contains preferably 0.1 to 10% by weight, particularly preferably 0.5 to 8.0% by weight, further particularly preferably 2.0 to 6.0% by weight, of the concentrate and water.

In one embodiment, the disinfectant according to the invention consists of
0.1-10% by weight of at least two organic acids selected from acetic acid, propionic acid, lactic acid and tartaric acid or a combination of these,
0.1-10% by weight of sodium benzoate,
auxiliaries, for example surfactants, solubilizers and water
wherein the components add up to 100% by weight.

According to the invention, the object is further achieved by a disinfectant concentrate for the preparation of the disinfectant according to the invention for the disinfection of inanimate surfaces, containing
0.1-85% by weight of at least three organic acids or the salts thereof selected from the group consisting of acetic acid, propionic acid, tartaric acid, benzoic acid and lactic acid,
a solvent, preferably water, and
optionally solubilizers selected from glycols, glycol ethers or a mixture thereof,
wherein the specified amounts are based in each case on the total amount of the concentrate.

In the disinfectant concentrate according to the invention, the amount of each individual organic acid is preferably not more than 50% by weight and the total amount of acids is not more than 85% by weight.

In one embodiment, the disinfectant concentrate according to the invention consists of
0.1-15% lactic acid,
0.1-50% by weight of acetic acid,
0.1-50% by weight of propionic acid,
wherein the sum of acetic acid and propionic acid is between 15% by weight and 60% by weight,
0-25% by weight of sodium benzoate,
0-6% by weight of tartaric acid,
0-15% by weight of sodium acetate
optionally solvent and
optionally auxiliaries (disinfection additives) selected from: pH regulators, surfactants, solubilizers, corrosion inhibitors, dyes, fragrances, complexing agents, wherein the components add up to 100% by weight and the total amount of acids is at least 21% by weight.

In a further preferred embodiment, the disinfectant concentrate according to the invention consists of
21-85% by weight of at least three organic acids selected from
0.1-50% by weight of acetic acid,
0.1-50% by weight of propionic acid,
0.1-6% by weight of tartaric acid,
0.1-30% by weight of lactic acid and
0.1-15% by weight of sodium benzoate, —2-20% by weight of solubilizer selected from hexyl carbitol, propylene glycol, methyl carbitol, butyl carbitol, monoethylene glycol or a combination of these and water,
wherein the components add up to 100% by weight.

In a further embodiment, the disinfectant concentrate according to the invention consists of
15-45% by weight of at least two organic acids selected from acetic acid, propionic acid, lactic acid or a combination of these,
6-13% by weight of sodium benzoate
auxiliaries, such as, for example, solubilizers and pH regulators
water,
wherein the components add up to 100% by weight.

Preferably, the disinfectant according to the invention contains as antimicrobial active ingredient the following combinations of organic acids, wherein no further organic acids are present:
Combination A: propionic acid, lactic acid, sodium benzoate
Combination B: propionic acid, lactic acid, acetic acid
Combination C: propionic acid, acetic acid, sodium benzoate
Combination D: acetic acid, lactic acid, sodium benzoate
Combination E: propionic acid, lactic acid, acetic acid, sodium benzoate
Combination F: tartaric acid, propionic acid, acetic acid, lactic acid, sodium benzoate.

Particularly preferred embodiments of the concentrate according to the invention are the following compositions:

| Concentrates | [%] | [%] | [%] | [%] | [%] |
|---|---|---|---|---|---|
| Lactic acid | 15 | — | — | | 1 |
| Tartaric acid | — | — | 6 | | — |
| Acetic acid | 15 | 15 | 15 | 30 | 5 |
| Propionic acid | 15 | 15 | 15 | 30 | 15 |

-continued

| Concentrates | [%] | [%] | [%] | [%] | [%] |
|---|---|---|---|---|---|
| Sodium benzoate | 6 | 13 | — | 6 | 13 |
| Sodium acetate | — | — | — | — | — |
| Propylene glycol | 10 | 12 | 10 | 10 | 10 |
| Hexyl carbitol | 10 | 14 | 10 | 10 | 10 |
| Demineralized water | 29 | 31 | 44 | 13.5 | 46 |
| Linear alcohol ethoxylate* | | | | 0.5 | — |

*Marlipal 1618/25, nonionic surfactant manufactured by Sasol Germany GmbH

The disinfectant according to the invention preferably has a pH of 1.0 to 7.0, particularly preferably ≥2.0-≤6.0. The pH can be adjusted by addition of low amounts of pH regulators, such as strong bases or strong acids, for example sulfuric acid, potassium hydroxide, sodium sulfite. Preferably, the use of a pH regulator is dispensed with.

The disinfectant concentrates according to the invention can contain, as auxiliaries, solubilizers and/or pH regulators and/or surfactants. Suitable solubilizers are, for example, diethylene glycol mono-n-hexyl ether (hexyl carbitol) and/or 1,2-propanediol (propylene glycol), as well as methyl carbitol, butyl carbitol, monoethylene glycol. Further auxiliaries, which are less preferred according to the invention, are corrosion inhibitors, foam regulators, dispersants, dyes, perfume or mixtures thereof.

Hexyl carbitol and/or propylene glycol are preferably used at a weakly acidic pH in aqueous disinfectants containing sodium benzoate. The quantity ratio of sodium benzoate to hexyl carbitol is preferably between 4:1 and 1:4, particularly preferably 3:1. If propylene glycol is used, the quantity ratio of sodium benzoate to propylene glycol is between 4:1 and 1:4, particularly preferably 1:1.5. Particularly preferably, the combination of hexyl carbitol with propylene glycol in the presence of sodium benzoate is in a preferred ratio of sodium benzoate:hexyl carbitol:propylene glycol=3/1/5 or 3/5/5. Further solubilizers which can be used at pH<7.0 are: methyl carbitol, butyl carbitol, monoethylene glycol and combinations of these.

Preferably, the disinfectants according to the invention and the disinfectant concentrates according to the invention contain, as solubilizers, glycols selected from propylene glycol and monoethylene glycol and/or glycol ethers selected from methyl carbitol, butyl carbitol and hexyl carbitol, particularly preferably a combination of propylene glycol and hexyl carbitol.

Preferably, the disinfectants according to the invention and the disinfectant concentrates according to the invention contain, as sole antimicrobial active ingredient, organic acids and no further antimicrobial active ingredients. Particularly preferably, the disinfectants according to the invention contain no quaternary ammonium compounds, no aldehydes, no guanidines, no active chlorine, no amines, no oxygen-releasing agents, no monohydric alcohols, no aromatic alcohols, no metal ions and no combinations of these antimicrobial active ingredients.

Surprisingly, it is possible using the disinfectant according to the invention to already achieve, just through addition of organic acids without further antimicrobial active ingredients, a sufficient microbicidal efficacy against a broad spectrum of microorganisms after two minutes, five minutes or 15 minutes. Moreover, the combination of multiple organic acids that is in accordance with the invention represents, surprisingly, a synergistic composition owing to differently combined mechanisms of action and allows a sufficient, pathogen-killing action.

The list of organic acids suitable as active ingredients of disinfection compositions comprises:
formic acid, ascorbic acid, benzoic acid, dehydroacetic acid, acetic acid, fumaric acid, glycolic acid, lactic acid, mandelic acid, phenylacetic acid, propionic acid, salicylic acid, tartaric acid, zinc stearic acid, citric acid, present in each case as free acid, salt and in any combination, preferably acetic acid, lactic acid, propionic acid, tartaric acid, sodium benzoate/benzoic acid or mixtures thereof.

Preferably, the disinfectant concentrates according to the invention contain organic acids having 2 to 8 carbon atoms, preferably 3 to 7 carbon atoms.

In one embodiment, the disinfectants according to the invention and the disinfectant concentrates according to the invention additionally contain nonionic surfactants, cationic surfactants, amphoteric surfactants, or a combination of these, and preferably no anionic surfactants.

There are many compounds which belong to the group of organic acids and which can differ in structure and mode of action. One way of characterizing organic acids is the degree of dissociation in the aqueous medium. The dissociation constant of an organic acid (Ka) decreases with increasing chain length; the acid dissociates more weakly.

Organic acids can have an antimicrobial action owing to their acid function and their structure. Thus, a long-chain fatty acid can, owing to its hydrophilic and hydrophobic moiety, also have an antimicrobial character as surface-active substance, comparable to surfactants, whereas a short-chain acid can act through the lowering of pH. The acidity can be deduced from the pKa value. The pKa corresponds to the negative common logarithm of the acid constant Ka and provides information about the equilibrium position of an acid which reacts with water. The pKa therefore serves as a measure of the strength of an acid, with a small value meaning a strong acid.

Preferably, the disinfectant according to the invention and the disinfectant concentrate according to the invention comprise, as antimicrobial active ingredient (active component), exclusively organic acids having a pKa between 2 and 6, preferably having a pKa between 3 and 5.

The organic acids preferred according to the invention have the following pKa values (at 20° C.)
pKa tartaric acid: 3.04
pKa lactic acid: 3.87
pKa benzoic acid: 4.17
pKa acetic acid: 4.76
pKa propionic acid: 4.88.

Surprisingly, the organic acids in combination can be used effectively according to the invention against microorganisms, since the following mechanisms of action apparently accumulate synergistically:

(1) Action due to lowering of the pH through dissociation of the organic acid. $R-COOH+H_2O \rightarrow R-COO^- + H_3O^+$.
Reason: Each microorganism has its cardinal conditions; if there is a change to these—for example the pH—the growth rate decreases (up to inhibition).

(2) Action due to attachment of the acid anion to the cell membrane of the microorganism. $R-COO^- \rightarrow$ cell wall/phospholipid membrane.
Reason: Disruption of cell proliferation and equilibrium concentration between intracellular and extracellular space. According to one assumption, the long-chain fatty-acid anions are positioned between the phospholipid molecules and are, from a certain concentration, statistically sufficiently close to one another for them, owing to their $COO^-$ groups, to push apart the membrane molecules and to thus effectively contribute to the perforation of the cell membrane.

(3) Intracellular action: The undissociated acid (R—COOH) can, owing to an absent hydration shell, pass through the cell wall of a microorganism more easily than the corresponding anion. In the interior of the organism, a relatively high pH prevails, resulting in the acid activity being released—comparable to (1)—and this leads to the denaturation of important proteins and further unspecific reactions within the organism.

(4) Some aromatic carboxylic acids can act as depolarizers via their redox potential, by, for example, being able to inhibit ion channels of the cells and to thus lead to a charge reversal.

During the preparation of the concentrates according to the invention, a further unexpected effect was found. In the presence of a relatively strong acid, sodium benzoate does not exhibit any solubility in an aqueous, glycol-containing solution. It is found that, surprisingly, sodium benzoate in the presence of relatively weak acids can, even in the presence of a relatively strong acid and low pH values, be dissolved without any problems to form a colorless and clear composition. This is surprising, since the presence of a relatively strong acid leads to a protonation of the benzoate, resulting in the presence of the poorly water-soluble benzoic acid. The presence of at least one relatively weak acid is sufficient for bringing sodium benzoate into a stable, aqueous, colorless solution.

In a preferred embodiment, the application solution consists of
a) 0.45-10% by weight of at least one organic acid selected from acetic acid, propionic acid or a combination of these,
b) 0.1-1% by weight selected from sodium benzoate or sodium acetate or a combination of these,
c) 0-2% by weight of solubilizer selected from hexyl carbitol and propylene glycol or a combination of these and
d) water,
wherein at least 3 acids and/or the salts thereof (a) and (b) are present.

In a further preferred embodiment, the application solution consists of
a) 0.45-10% by weight of at least one organic acid selected from acetic acid, propionic acid or a combination of these,
b) 0.1-1% by weight selected from sodium benzoate or sodium acetate or a combination of these,
c) 0.1-1% by weight of lactic acid,
d) 0-2% by weight of solubilizer selected from hexyl carbitol and propylene glycol or a combination of these and
e) water,
wherein the sum of $$\frac{(a)}{10} + (c) \text{ is} < 1.0.$$

In a preferred embodiment, the application solution consists of
a) 0.45-10% by weight of at least one organic acid selected from acetic acid, propionic acid or a combination of these,
b) 0.1-1% by weight selected from sodium benzoate or sodium acetate or a combination of these,
c) 0.1-1% by weight of tartaric acid,
d) 0-2% by weight of solubilizer selected from hexyl carbitol and propylene glycol or a combination of these and
e) water,
wherein the sum of (a)+(c) is <10.0.

In a preferred embodiment, the application solution consists of
a) 0.45-10% by weight of at least one organic acid selected from acetic acid, propionic acid or a combination of these,
b) 0.1-1% by weight selected from sodium benzoate or sodium acetate or a combination of these,
c) optionally 0.1-1% by weight of lactic acid,
d) optionally 0.1-1% by weight of tartaric acid,
e) 0-2% by weight of solubilizer selected from hexyl carbitol and propylene glycol or a combination of these and
f) water,
wherein the sum of $$\frac{(a)}{10} + (c) + (d) \text{ is} < 1.0.$$

Preferably, the application solution of the disinfectant according to the invention contains organic acids in a concentration of 0.1-10% by weight, particularly preferably 0.3-5.0% by weight.

More particularly, the sum of propionic acid, acetic acid, lactic acid and tartaric acid in the application solution is below 10% by weight.

Particularly preferably, the organic acids in the application solution mathematically meet the following conditions (data in % by weight):

$$\frac{\text{Acetic acid and/or propionic acid}}{10} + \frac{\text{Tartaric acid} + \text{lactic acid}}{1} \leq 1.0$$

$$\frac{\text{Acetic acid and/or propionic acid}}{10} + \frac{\text{Lactic acid}}{1} \leq 1.0$$

$$\frac{\text{Acetic acid and/or propionic acid}}{10} + \frac{\text{Tartaric acid}}{10} \leq 1.0$$

$$\frac{\text{Tartaric acid} + \text{lactic acid}}{1} \leq 1.0$$

Surprisingly, the disinfectants according to the invention and the concentrates according to the invention exhibit, with their combinations of organic acids, an antimicrobial efficacy which goes far beyond an inhibition of growth, and can be used for preparing effective disinfectants which already exhibit after a few minutes a complete reduction of bacteria, yeasts and even mycobacteria (reduction by at least 4 logs against yeasts and mycobacteria, at least 5 logs of bacteria).

The disinfectant concentrates according to the invention and the disinfectants according to the invention are preferably used for the disinfection of inanimate surfaces, especially for the reduction (killing) of yeasts, especially of *Candida albicans*, and/or reduction (killing) of bacteria, especially of *Staphylococcus aureus*. Preferably, the disinfectant concentrate or the disinfectant is used to bring about at least a log 4 reduction with respect to *Candida albicans* within 2 minutes in accordance with the "Standardmethoden der DGHM zur Prüfung chemischer Desinfektionsverfahren" [Standard methods of the German Society for Hygiene and Microbiology for testing chemical disinfection methods] (version of 1 Sep. 2001) in the quantitative suspension test. Further preferably, the disinfectant or the concentrate is used to bring about at least a log 5 reduction with respect to *Staphylococcus aureus* within 2 minutes in accordance with the "Standardmethoden der DGHM zur Prüfung chemischer Desinfektionsverfahren" [Standard methods of the German Society for Hygiene and Microbiology for testing chemical disinfection methods] (version of 1 Sep. 2001) in the quantitative suspension test. Further preferably, the disinfectant or the concentrate is used to bring about at least a log 4 reduction with respect to *Mycobacterium terrae* within 15 minutes, preferably within 10 minutes, further preferably within 5 minutes, particularly preferably within 2 minutes, in accordance with the "Standardmethoden der DGHM zur Prüfung chemischer Desinfektionsverfahren" [Standard methods of the German Society for Hygiene and Microbiology for testing chemical disinfection methods] (version of 1 Sep. 2001) in the quantitative suspension test.

Particularly preferably, the disinfectant or the concentrate is used to bring about at least a log 4 reduction with respect to *Candida albicans* within 2 minutes and at least a log 5 reduction with respect to *Staphylococcus aureus* within 2 minutes and at least a log 4 reduction with respect to *Mycobacterium terrae* within 15 minutes, preferably within 10 minutes, further preferably within 5 minutes, particularly preferably within 2 minutes, in accordance in each case with the "Standardmethoden der DGHM zur Prüfung chemischer Desinfektionsverfahren" [Standard methods of the German Society for Hygiene and Microbiology for testing chemical disinfection methods] (version of 1 Sep. 2001) in the quantitative suspension test.

Particularly preferably, the disinfectant according to the invention or the disinfectant concentrate according to the invention is used for the reduction of the microorganisms *S. aureus* and *C. albicans*. The test for antimicrobial efficacy is done especially at low organic load, i.e., in the presence of 0.03% albumin, but can also be done under high organic load, i.e., in the presence of 0.3% albumin and 0.3% sheep erythrocytes, the pathogen reduction necessary in accordance with the DGHM or EN standard also being achieved at high load.

The disinfectant concentrate according to the invention and the disinfectant according to the invention have the advantage that they are suitable not only for the reduction of the stated test pathogens *M. terrae, C. albicans* and *S. aureus*, but also simultaneously reduce other microorganisms, such as *M. avium, E. coli, P. aeruginosa* and *E. hirae*. It is therefore possible to reduce a multitude of different pathogens at the same time using just one disinfectant.

The disinfectants according to the invention and the disinfectant concentrates according to the invention can be used in combination with a substrate (e.g., ready-to-use cloth).

Moreover, the liquid disinfectant can be used in the form of a presoaked, appropriate support material for wipe disinfection, the support material being formed from a synthetic plastic from the group consisting of polyester, polyamide, polyurethane, polyethylene, polypropylene, polytetrafluoroethylene (PTFE), preferably polyester.

The support material is, for example, a cloth, a sponge or another application aid. The disinfectant used according to the invention is preferably applied in the form of a foam, of a liquid or in the form of a disinfectant-impregnated cloth, sponge or other application aid. Here, the disinfectant can be brought directly to the surface to be treated, without further dilutions.

EXAMPLES

Preparation of the Concentrates and Application Dilutions

Concentrates having the compositions specified in Tables 1 and 2 were prepared. The first preparation step involved initially charging the water (if applicable) and the solubilizer in a suitable vessel. In the next step, the organic acids were added. It was found that combinations of liquid acids can be added together without any solubility problems. When using solid acids or the salts thereof, such as, for example, benzoic acid, sodium benzoate, sodium acetate and tartaric acid, there was in some cases a temporary turbidity of the solution in combinations with the liquid acids. Moreover, there was in some cases low heat generation in the case of combination of acid and salts, and it is for this reason that a slow addition is advantageous. In the last step, surfactants were additionally added, if applicable. Thereafter, the composition was stirred until a colorless, clear solution representing the concentrate was formed. From the concentrates, application solutions were prepared by dilution with water of standardized hardness (WSH). These were tested for antimicrobial efficacy. The concentrations of the application solution are specified in Tables 4 to 9 for the various measurement series.

A particular phenomenon is found in the preparation of the disinfectant concentrates according to the invention: in the presence of a relatively strong acid, sodium benzoate and/or benzoic acid exhibit no solubility in aqueous solution Comparative Example A. It is found that, surprisingly, sodium benzoate and/or benzoic acid in the presence of at least one relatively weak acid can, even at low pH values, be dissolved in aqueous solution without any major problems to form a colorless and clear composition. Examples B, C and E show that the presence of at least one relatively weak acid is sufficient to bring sodium benzoate and/or benzoic acid into a stable, aqueous, colorless solution, even in the presence of a relatively strong acid.

TABLE 1

Recipes of concentrates A to E in % by weight; A, D: comparative examples; B, C, E: according to the invention

|  | A (comparison) | B | C | D (comparison) | E |
|---|---|---|---|---|---|
| Lactic acid (90%) | 15.0 | 15.0 | 15.0 | 15.0 | 15.0 |
| Tartaric acid (100%) | — | — | — | — | — |
| Acetic acid (100%) | — | — | 15.00 | — | 15.00 |
| Propionic acid | — | 15.00 | — | — | — |
| Sodium benzoate | 6.0 | 6.0 | 6.0 | — | — |
| Benzoic acid | — | — | — | 6.0 | 6.0 |
| Propylene glycol | 10.0 | 10.0 | 10.0 | 10.0 | 10.0 |
| Hexyl carbitol | 10.0 | 10.0 | 10.0 | 10.0 | 10.0 |
| Demineralized water | 59.0 | 44.0 | 44.0 | 59.0 | 44.0 |
|  | Insoluble, two phases | Soluble, colorless, clear | Soluble, colorless, clear | Insoluble, two phases | Soluble, colorless, clear |

Recipes

TABLE 2 a

Recipes of inventive concentrates 1 to 6 in % by weight, Marlipal ® 1618/25: linear alcohol ethoxylate, manufacturer Sasol Germany

| Example | 1 | 2 | 3 | 4 | 5 | 6 |
|---|---|---|---|---|---|---|
| Lactic acid (90%) | 15.0 | 12.0 | 30.0 | 1.0 | 1.4 | 15.0 |
| Tartaric acid (100%) | — | — | — | 1.4 | 2.0 | — |
| Acetic acid (100%) | 44.0 | 42.0 | 44.0 | 9.5 | 5.0 | — |
| Propionic acid | 15.0 | — | — | 9.5 | 5.0 | 15.0 |
| Sodium benzoate | 6.0 | 6.0 | 6.0 | 0.3 | 0.4 | 6.0 |
| Propylene glycol | 10.0 | 10.0 | 10.0 | 0.4 | 0.4 | 10.0 |
| Hexyl carbitol | 10.0 | 10.0 | 10.0 | 0.4 | 0.4 | 10.0 |
| Demineralized water | — | 20.0 | — | 77.1 | 85.0 | 44.0 |
| Marlipal ® 1618/25 | — | — | — | 0.4 | 0.4 | — |
| pH regulators | — | — | — | — | — | — |
| pH | 2.63 | 3.10 | 2.50 | 2.20 | 2.23 | 3.57 |

TABLE 2 b

Recipes of inventive concentrates 7 to 12 in % by weight, Dehydol ® 04 DEO: fatty alcohol C8 with approx. 4 mol EO, manufacturer BASF

| Example | 7 | 8 | 9 | 10 | 11 | 12 |
|---|---|---|---|---|---|---|
| Lactic acid (90%) | 15.0 | 15.0 | 10.0 | — | — | 15 |
| Tartaric acid (100%) | — | — | — | — | — | — |
| Acetic acid (100%) | 15.0 | 40.0 | — | 15 | 30 | 40 |
| Propionic acid | 15.0 | 15.0 | 40.0 | 15 | 30 | 15 |
| Sodium benzoate | 6.0 | 6.0 | 6.0 | 6 | 6 | 6 |
| Propylene glycol | 10.0 | 10.0 | 6.0 | 10 | 10 | 10 |
| Hexyl carbitol | 10.0 | 10.0 | 6.0 | 10 | 10 | 10 |
| Demineralized water | 29.0 | — | 32.0 | 44 | 14 | — |
| Dehydol ® 04 DEO | — | 4.0 | — | — | — | 4 |
| pH regulators | — | — | — | — | — | KOH (50%) |
| pH | 3.34 | 2.64 | 3.52 | 3.96 | 3.43 | 5.06 |

TABLE 2 c

Recipes of inventive concentrates 13 to 18 in % by weight, Marlipal ® 1618/25: linear alcohol ethoxylate, manufacturer Sasol Germany Dehydol ® 04 DEO: fatty alcohol C8 with approx. 4 mol EO, manufacturer BASF

| Example | 13 | 14 | 15 | 16 | 17 | 18 |
|---|---|---|---|---|---|---|
| Lactic acid (90%) | — | 15 | 15 | — | 1 | — |
| Tartaric acid (100%) | 6 | — | — | — | — | — |
| Acetic acid (100%) | 15 | 40 | 15 | 15 | 5 | 30 |
| Sodium acetate | — | — | — | — | — | — |
| Propionic acid | 15 | 15 | 15 | 15 | 15 | 30 |
| Sodium benzoate | — | — | — | 13 | 13 | 6 |
| Propylene glycol | 10 | 10 | 10 | 12 | 10 | 10 |
| Hexyl carbitol | 10 | 10 | 10 | 14 | 10 | 10 |
| Demineralized water | 44 | 6 | 35 | 31 | 46 | 13.5 |
| Marlipal 1618/25 | — | — | — | — | — | 0.5 |
| Dehydol ® 04 DEO | — | 4 | — | — | — | — |
| pH regulators | — | KOH (50%) | KOH (50%) | — | — | — |
| pH | 2.12 | 2.25 | 2.31 | 4.41 | 4.61 | 3.43 |

TABLE 3a

Recipes of noninventive concentrates V1 to V5 in % by weight, Dehydol ® 04 DEO: fatty alcohol C8 with approx. 4 mol EO, manufacturer BASF Lutensol ® ON 110: nonionic surfactant with branched C10 alcohol, manufacturer BASF

| Example | V1 | V2 | V3 | V4 | V5 |
|---|---|---|---|---|---|
| Lactic acid (90%) | 15 | — | 9.7 | — | — |
| Tartaric acid (100%) | — | — | — | 48.5 | — |
| Acetic acid (100%) | — | — | — | — | — |
| Propionic acid | — | 15 | — | — | 97.0 |
| Sodium benzoate | 6 | 6 | — | — | — |
| Propylene glycol | 10 | 10 | 1.0 | 1.0 | 1.0 |
| Hexyl carbitol | 10 | 10 | 1.0 | 1.0 | 1.0 |
| Demineralized water | 44 | 59 | 87.3 | 48.5 | — |
| Dehydol 04 DEO | — | — | 1.0 | 1.0 | 1.0 |
| Lutensol ON 110 | 15 | — | — | — | — |
| pH regulators | — | — | — | — | — |
| pH | 3.75 | 4.55 | 1.83 | 0.62 | 1.90 |

TABLE 3b

Recipes of noninventive concentrates V1 to V5 in % by weight, Dehydol ® 04 DEO: fatty alcohol C8 with approx. 4 mol EO, manufacturer BASF

| Example | V6 | V7 | V8 | V9 | V10 |
|---|---|---|---|---|---|
| Lactic acid (90%) | — | 6.0 | — | — | — |
| Tartaric acid (100%) | — | — | — | — | — |
| Acetic acid (100%) | 97.0 | — | — | 15 | — |
| Sodium acetate | — | — | — | — | — |
| Propionic acid | — | — | — | 15 | 15 |
| Sodium benzoate | 1.0 | — | — | — | 13 |
| Propylene glycol | 1.0 | 15 | 15 | 10 | 10 |
| Hexyl carbitol | — | 15 | 15 | 10 | 10 |
| Demineralized water | 1.0 | 34 | 40 | 50 | 52 |
| Dehydol 04 DEO | — | 30 | 30 | — | — |
| pH regulators | — | — | — | — | — |
| pH | 0.69 | 3.05 | 2.94 | 2.02 | 5.05 |

Testing for Antimicrobial Efficacy

The disinfectant according to the invention or the disinfectant concentrate according to the invention brings about at least a log 4 reduction with respect to *C. albicans* in accordance with the "Standardmethoden der DGHM zur Prüfung chemischer Desinfektionsverfahren" [Standard methods of the German Society for Hygiene and Microbiology for testing chemical disinfection methods] (version of 1 Sep. 2001) in the quantitative suspension test. The disinfectant concentrate according to the invention or the application solution according to the invention brings about at least a log 4 reduction with respect to *C. albicans* and a log 5 reduction with respect to *S. aureus* in less than 60 minutes in accordance with the "Standardmethoden der DGHM zur Prüfung chemischer Desinfektionsverfahren" [Standard methods of the German Society for Hygiene and Microbiology for testing chemical disinfection methods] (version of 1 Sep. 2001) in the quantitative suspension test.

Besides the DGHM tests, there is also the option of testing in accordance with European Standard (EN) 13624 "Chemical disinfectants and antiseptics—Quantitative suspension test for the evaluation of yeasticidal activity of chemical disinfectants in the medical area—Test method and requirements (phase 2, step 1)"; in this case, the procedure and evaluation is nearly identical to the DGHM tests.

The following tables each show the log reduction with respect to various test pathogens at various organic loads.

Low organic load corresponds to the presence of 0.03% albumin; high organic load corresponds to the presence of 0.3% albumin and 0.3% sheep erythrocytes.

*Candida albicans*

TABLE 4a

Reduction factors of x % application solutions with respect to *Candida albicans*, at various organic loads

| Example | % | 15 min | 30 min | 45 min | 60 min | Organic load |
|---|---|---|---|---|---|---|
| 1 | 2 | — | <1.92 | <1.93 | <1.93 | Low |
|   | 3 | <1.93 | 4.46 | >6.41 | — |   |
| 2 | 3 | <1.79 | <1.85 | <1.63 | — | High |
|   | 4 | <1.79 | 2.26 | >6.11 | — |   |
|   | 5 | 2.98 | >6.33 | >6.11 | — |   |
| 3 | 2 | — | <1.92 | <1.93 | <1.93 | Low |
|   | 3 | <1.93 | 2.47 | 4.03 | — |   |
| 4 | 20 | <1.76 | <1.78 | — | <1.82 | Low |
|   | 40 | 5.94 | >6.26 | — | >6.30 |   |
| 5 | 20 | <1.76 | <1.78 | — | <1.82 | Low |
|   | 40 | <1.76 | 2.26 | — | >6.30 |   |
| 6 | 3 | <1.93 | 3.21 | 5.44 | — | Low |
|   | 4 | >6.41 | >6.42 | >6.44 | — |   |
|   | 5 | >6.41 | >6.42 | >6.44 | — |   |
| 7 | 3 | 4.44 | >6.42 | >6.44 | — | Low |
|   | 4 | >6.41 | >6.42 | >6.44 | — |   |
|   | 5 | >6.41 | >6.42 | >6.44 | — |   |
| 8 | 3 | 3.43 | >6.42 | >6.44 | — | Low |
|   | 4 | >6.41 | >6.42 | >6.44 | — |   |
|   | 5 | >6.41 | >6.42 | >6.44 | — |   |
| V1 | 3 | <1.93 | <1.94 | <1.96 | — | Low |
|   | 4 | <1.93 | <1.94 | 2.04 | — |   |
|   | 5 | <1.93 | 3.11 | 4.63 | — |   |
| V2 | 3 | <1.93 | <1.94 | <1.96 | — | Low |
|   | 4 | 2.28 | 4.28 | 5.96 | — |   |
|   | 5 | >6.41 | >6.42 | >6.44 | — |   |
| 9 | 3 | <1.93 | <1.94 | 2.98 | — | Low |
|   | 4 | >6.41 | >6.42 | >6.44 | — |   |
|   | 5 | >6.41 | >6.42 | >6.44 | — |   |
| V3 | 5 | <1.61 | <1.59 | — | <1.56 | Low |
|   | 10 | <1.61 | <1.59 | — | <1.56 |   |
| V4 | 5 | <1.61 | <1.59 | — | <1.56 | Low |
|   | 10 | <1.61 | <1.59 | — | <1.56 |   |
| V5 | 5 | <1.61 | 2.31 | — | 5.74 | Low |
|   | 10 | >6.09 | >6.07 | — | >6.04 |   |
| V6 | 5 | <1.61 | <1.59 | — | <1.56 | Low |
|   | 10 | 5.01 | >6.07 | — | >6.04 |   |
| V7 | 2 | <1.78 | <1.84 | — | — | High |
|   | 3 | <1.78 | <1.84 | — | — |   |
| V8 | 2 | <1.78 | <1.84 | — | — | High |
|   | 3 | <1.78 | <1.84 | — | — |   |
| 10 | 3 | <1.90 | <1.89 | <1.90 | — | Low |
|   | 4 | <1.90 | 2.65 | 4.84 | — |   |
|   | 5 | >6.38 | >6.37 | >6.38 | — |   |
| 11 | 3 | <1.90 | <1.89 | <1.90 | — | Low |
|   | 4 | >6.38 | >6.37 | >6.38 | — |   |
|   | 5 | >6.38 | >6.37 | >6.38 | — |   |
| V9 | 3 | <1.90 | <1.89 | <1.90 | — | Low |
|   | 4 | <1.90 | <1.89 | <1.90 | — |   |
|   | 5 | <1.90 | <1.89 | <1.90 | — |   |
| 15 | 3 | <1.72 | <1.70 | <1.75 | — | Low |
|   | 4 | <1.72 | <1.70 | <1.75 | — |   |
|   | 5 | <1.72 | <1.70 | <1.75 | — |   |
| V10 | 3 | <1.72 | <1.70 | <1.75 | — | Low |
|   | 4 | <1.72 | <1.70 | 2.10 | — |   |
|   | 5 | >5.20 | >5.18 | >5.23 | — |   |

*Candida albicans*

TABLE 4b

Reduction factors of x % application solutions with respect to *Candida albicans*, at low organic load

| — | % | 2 min | 5 min | 15 min | Organic load |
|---|---|---|---|---|---|
| 16 | 5.5 | 4.36 | 4.36 | 5.25 | Low |
| 17 | 4 | <1.94 | <1.94 | 2.20 | Low |
|   | 5 | 3.85 | 5.52 | >6.39 |   |
|   | 6 | >6.42 | >6.42 | >6.42 |   |

*Staphylococcus aureus*

TABLE 5

Reduction factors of x % application solutions with respect to *Staphylococcus aureus*, at various organic loads

|   | % | 15 min | 30 min | 45 min | 60 min | Organic load |
|---|---|---|---|---|---|---|
| 1 | 2 | — | >7.21 | >7.23 | >7.22 | Low |
|   | 3 | >7.21 | >7.13 | >7.22 | — |   |
| 2 | 1 | <1.68 | 2.61 | 1.05 | — | High |
|   | 3 | >7.16 | >7.15 | >7.16 | — |   |
|   | 5 | >7.16 | >7.15 | >7.16 | — |   |
| 3 | 2 | >7.21 | >7.23 | — | >7.22 | Low |
|   | 3 | >7.18 | >7.21 | — | >7.23 |   |
| 4 | 5 | <1.63 | <1.68 | — | <1.70 | Low |
|   | 20 | 5.47 | >7.16 | — | >7.18 |   |
|   | 40 | >7.11 | >7.16 | — | >7.18 |   |
| 5 | 5 | <1.63 | <1.68 | — | <1.70 | Low |
|   | 20 | 4.64 | 5.27 | — | >7.18 |   |
|   | 40 | 6.33 | >7.16 | — | >7.18 |   |
| 6 | 3 | >7.32 | >7.42 | >7.32 | — | Low |
|   | 4 | >7.32 | >7.42 | >7.32 | — |   |
|   | 5 | >7.32 | >7.42 | >7.32 | — |   |
| 7 | 3 | >7.32 | >7.42 | >7.32 | — | Low |
|   | 4 | >7.32 | >7.42 | >7.32 | — |   |
|   | 5 | >7.32 | >7.42 | >7.32 | — |   |
| 8 | 3 | >7.32 | >7.42 | >7.32 | — | Low |
|   | 4 | >7.32 | >7.42 | >7.32 | — |   |
|   | 5 | >7.32 | >7.42 | >7.32 | — |   |
| V1 | 3 | 3.03 | 5.14 | 6.42 | — | Low |
|   | 4 | 5.81 | >7.42 | >7.32 | — |   |
|   | 5 | >7.32 | >7.42 | >7.32 | — |   |
| V2 | 3 | <1.84 | <1.94 | <1.84 | — |   |
|   | 4 | <1.84 | <1.94 | <1.84 | — |   |
|   | 5 | <1.84 | <1.94 | <1.84 | — |   |
| 9 | 3 | 5.02 | 6.10 | >7.32 | — | Low |
|   | 4 | >7.32 | >7.42 | >7.32 | — |   |
|   | 5 | >7.32 | >7.42 | >7.32 | — |   |
| V3 | 5 | <1.26 | <1.32 | — | <1.21 | Low |
|   | 10 | 1.90 | 3.15 | — | 4.53 |   |
| V4 | 5 | >6.74 | >6.80 | — | >6.69 | Low |
|   | 10 | >6.74 | >6.80 | — | >6.69 |   |
| V5 | 5 | 6.36 | >6.80 | — | >6.69 | Low |
|   | 10 | >6.74 | >6.80 | — | >6.69 |   |
| V6 | 5 | 5.17 | >6.80 | — | >6.69 | Low |
|   | 10 | >6.74 | >6.80 | — | >6.69 |   |
| V7 | 2 | <1.65 | <1.65 | — | — | High |
|   | 3 | <1.65 | <1.65 | — | — |   |
| V8 | 2 | <1.65 | <1.65 | — | — | High |
|   | 3 | <1.65 | <1.65 | — | — |   |
| 10 | 3 | <1.73 | 3.87 | >7.25 | — | Low |
|   | 4 | >7.21 | >7.22 | >7.25 | — |   |
|   | 5 | >7.21 | >7.22 | >7.25 | — |   |
| 11 | 3 | 5.73 | 6.74 | >7.25 | — | Low |
|   | 4 | >7.21 | >7.22 | >7.25 | — |   |
|   | 5 | >7.21 | >7.22 | >7.25 | — |   |
| V9 | 3 | <1.73 | <1.74 | <1.77 | — | Low |
|   | 4 | <1.73 | <1.74 | 3.54 | — |   |
|   | 5 | 2.52 | 4.71 | >7.25 | — |   |
| 13 | 3 | <1.74 | <1.76 | <1.77 | — | Low |
|   | 4 | <2.18 | 5.71 | >7.25 | — |   |
|   | 5 | >7.22 | >7.24 | >7.25 | — |   |

TABLE 5-continued

Reduction factors of x % application solutions with respect to *Staphylococcus aureus*, at various organic loads

|  | % | 15 min | 30 min | 45 min | 60 min | Organic load |
|---|---|---|---|---|---|---|
| 15 | 3 | <1.58 | <1.50 | <1.61 | — | Low |
|  | 4 | 5.16 | >6.98 | >7.09 | — |  |
|  | 5 | >7.06 | >6.98 | >7.09 | — |  |
| V10 | 3 | <1.58 | 1.78 | 3.19 | — | Low |
|  | 4 | 4.15 | >6.98 | >7.09 | — |  |
|  | 5 | >7.06 | >6.98 | >7.09 | — |  |
| 14 | 3 | 4.05 | 4.77 | — | — | Low |
|  | 4 | 7.03 | >7.29 | >7.29 | — |  |

*Staphylococcus aureus*

TABLE 6

Reduction factors of x % application solutions with respect to *Staphylococcus aureus*, at various organic loads

|  | % | 2 min | 5 min | 15 min | 30 min | Organic load |
|---|---|---|---|---|---|---|
| 9 | 4 | — | >6.09 | — | — | Low |
|  | 5 | — | >6.09 | — | — |  |
| 16 | 5.5 | 5.05 | 5.49 | 5.75 | — | Low |

*Mycobacterium terrae*

TABLE 7

Reduction factors of x % application solutions with respect to *Mycobacterium terrae*, at various organic loads

|  | % | 15 min | 30 min | 45 min | 60 min | Organic load |
|---|---|---|---|---|---|---|
| 1 | 2 | <2.66 | <2.58 | <2.69 | — | Low |
|  | 3 | 6.19 | >7.06 | >7.17 | — |  |
|  | 4 | >7.14 | >7.06 | >7.17 | — |  |
| 8 | 2 | 3.11 | 6.28 | >7.17 | — | Low |
|  | 3 | >7.14 | >7.06 | >7.17 | — |  |
|  | 4 | >7.14 | >7.06 | >7.17 | — |  |
| 9 | 2 | <2.66 | <2.58 | <2.69 | — | Low |
|  | 3 | <2.66 | <2.58 | <2.69 | — |  |
|  | 4 | >7.14 | >7.06 | >7.17 | — |  |
| V7 | 2 | <1.70 | <1.86 | — | — | High |
|  | 3 | <1.70 | <1.86 | — | — |  |
| V8 | 2 | <1.55 | <1.40 | — | — | High |
|  | 3 | <1.55 | <1.40 | — | — |  |
| 12 | 3 | >5.18 | — | — | — | Low |
| 14 | 3 | 4.95 | >6.26 | >6.18 | — | Low |
|  | 5 | >6.18 | >6.26 | >6.18 | — |  |
| 15 | 3 | <1.71 | <1.57 | <1.65 | — | Low |
|  | 5 | 2.00 | 4.30 | >6.13 | — |  |
| V10 | 3 | <1.71 | <1.57 | 3.04 | — | Low |
|  | 5 | >6.19 | >6.05 | >6.13 | — |  |

*Pseudomonas aeruginosa*

TABLE 8

Reduction factors of x % application solutions with respect to *Pseudomonas aeruginosa*, at various organic loads

|  | % | 15 min | 30 min | 45 min | 60 min | Organic load |
|---|---|---|---|---|---|---|
| 1 | 2 | — | >7.01 | >7.05 | >7.06 | Low |
|  | 3 | >7.01 | >7.05 | >7.06 | — |  |
| 3 | 2 | — | >7.01 | >7.05 | >7.06 | Low |
|  | 3 | >7.01 | >7.05 | >7.06 | — |  |

TABLE 8-continued

Reduction factors of x % application solutions with respect to *Pseudomonas aeruginosa*, at various organic loads

|  | % | 15 min | 30 min | 45 min | 60 min | Organic load |
|---|---|---|---|---|---|---|
| V7 | 1 | 5.51 | 5.49 | — | — | High |
|  | 2 | >7.53 | >7.49 | — | — |  |
| V8 | 1 | <2.05 | <2.01 | — | — | High |
|  | 2 | <2.05 | <2.01 | — | — |  |

*Escherichia coli*

TABLE 9

Reduction factors of x % application solutions with respect to *Escherichia coli*, at various organic loads

|  | % | 15 min | 30 min | 45 min | 60 min | Organic load |
|---|---|---|---|---|---|---|
| 1 | 3 | >7.24 | >7.16 | >7.19 | — | Low |
|  | 4 | >7.24 | >7.16 | >7.19 | — |  |
| V7 | 1 | 4.57 | 5.26 | — | — | High |
|  | 2 | >7.53 | >7.49 | — | — |  |
| V8 | 1 | <1.84 | <1.84 | — | — | High |
|  | 2 | <1.84 | <1.84 | — | — |  |

Description of the Results:

The data of Comparative Examples V7 and V8 show that the addition of 6% lactic acid to a concentrate used as 1% application dilution, contains accordingly 0.06% lactic acid, have a sufficient efficacy with respect to *Escherichia coli* and *Pseudomonas aeruginosa*—even under high organic load. However, it is found that there is no discernible efficacy with respect to *Candida albicans*, *Mycobacterium terrae* and *Staphylococcus aureus* at this concentration. It is evident that *Staphylococcus aureus* and *Candida albicans* and *Mycobacterium terrae* are the limiting pathogens here.

A 5% test solution of Comparative Example V5 contains, in application dilution, nearly 4.85% propionic acid and exhibits yeasticidity after an exposure time of 60 minutes. Moreover, it exhibits a sufficient efficacy with respect to *Staphylococcus aureus* in the case of an exposure time of 15 minutes. The composition contains, as active substance, only propionic acid; in order to achieve better wetting of the microorganisms, a low amount of solubilizer and nonionic surfactant is added. On the basis of the data from Comparative Example V7 and V8, it can be ruled out that the solubilizer and the surfactant cause the antimicrobial effect.

According to the literature [S. Block; Disinfection, Sterilisation, and Preservation; 4th edition; ISBN 0-8121-1364-0; pages 807 ff.], propionic acid exhibits no efficacy against yeast—this is supposedly more likely to be counterproductive, since a multitude of yeasts metabolize propionic acid as nutrient. Moreover, there is supposedly poor efficacy against bacteria, with the exception of *Bacillus* mesentericus. Analogous thereto is V6, an acetic acid composition which comprises in test concentration nearly 4.85% acetic acid, and also a low amount of nonionic surfactant and solubilizer. Although a sufficient efficacy is found against *Staphylococcus aureus* after 15 minutes, this amount of acetic acid does not indicate efficacy with respect to *Candida albicans*.

Comparative Example V2 is a combination of 6% sodium benzoate and 15% propionic acid, which exhibits, as 4% application dilution, yeasticidal efficacy after 30 minutes. To obtain a better solubility in water, there is a low amount of solubilizer in the composition. It is not evident to a person skilled in the art that a 0.24% solution of sodium benzoate exhibits a sufficient yeasticidal efficacy in just 30 minutes. According to the literature (Wallhäußer et. al; Praxis der Sterilisation, Desinfektion, Antiseptik and Konservierung [Practical sterilization, disinfection, antisepsis and preservation]; ISBN 978-3-13-141121-1; pages 700 ff.), an application solution of 0.12% sodium benzoate acts microbicidally in 72 hours with respect to *C. albicans* (MMC>5 log, 1200 µg/ml). It can be considered out of the question that a doubling of the concentration from 0.12% to 0.24% leads to a reduction in the exposure time from 72 h to 30 min (0.7% of the exposure time). Moreover, according to the above-cited literature, propionic acid shows no efficacy on *Candida albicans*. Thus, a synergism with respect to *Candida albicans* that comes about through use of the two carboxylic acids sodium benzoate and propionic acid must be involved. However, under the selected test conditions, this recipe does not provide evidence of any efficacy with respect to *Staphylococcus aureus*.

The comparison of Comparative Example V2 with Example 6 shows that the addition of 15% lactic acid to the concentrate, corresponding in the case of a 3% solution to a concentration of 0.45%, brings about a significant improvement in yeasticidity, as well as an efficacy with respect to *Staphylococcus aureus*. This confirms the presumption of increasable synergism, since Comparative Examples V7 and V8 do not make it evident that lactic acid contributes to an efficacy with respect to *S. aureus* or *C. albicans*. This increase in efficacy is surprising, since Comparative Example V3 shows that an application solution containing 0.97% lactic acid has no efficacy on *Candida albicans* and insufficient efficacy with respect to *S. aureus*. Moreover, this assumption is confirmed by the comparison of V9 with Example 15. Here, it is likewise found that the addition of 0.6% lactic acid in application solution to a composition containing an identical amount of propionic acid and acetic acid brings about a significant increase in efficacy on *Staphylococcus aureus*.

The comparison of Comparative Example V2 with Example 10 shows that the addition of 15% acetic acid to sodium benzoate and propionic acid also brings about a significant increase in efficacy on *S. aureus*.

The comparison of Example 10 with Example 11 shows that further addition of acetic acid and propionic acid can, moreover, increase even further the efficacy against *S. aureus*: Example 10 shows, in the case of 3% application, insufficient reduction of *S. aureus* within 30 minutes, whereas Example 11 exhibits a reduction factor of RF>7 after just 15 min.

The comparison of Comparative Example V2 with Comparative Example V10 shows what effect an increase in the content of sodium benzoate has. Although the sodium benzoate concentration in Comparative Example 10 is more than twice as high as in Comparative Example V2, there is no improvement in the efficacy on *Candida albicans*; on the contrary, there is a deterioration. This supports the presumption of the synergistic composition due to the presence of at least three carboxylic acids. What is interesting about Comparative Example V2 and Comparative Example 10 is the pH of the composition. This is above the pKa value of benzoic acid of 4.22. Therefore, it is possible to infer the efficacy of sodium benzoate and not of benzoic acid.

Moreover, this becomes clear through the antimicrobial data of Example 8 and Example 12, since what was performed here was merely a pH correction and both recipes exhibit the maximum reduction factor against *Mycobacterium terrae* at 3% and an exposure time of 15 minutes. The difference between the two reduction factors, RF>7 in relation to RF>5, arises from different screenings, in which the maximal possible reduction factors differed.

Recipe 12 corresponds in terms of the composition to recipe 8, but was titrated with KOH (50%) to an elevated pH of >5.0 in order to determine the influence of pH on antimicrobial efficacy. Here, the consumption of KOH (50%) was 12.0 g. Since the large amount of pH regulator resulted in an increase in the total amount of the composition from 100 g to 112 g and this consequently leads to a reduction in the proportion of the acids, the application concentration was increased in order to have the same amount of active organic acids in the respective test solutions.

Composition 8, which has a native pH of 2.64, corresponds to a composition containing 100 g and was tested as 3% test solution. The pH-altered recipe 12 corresponds to 112 g and was consequently tested as 3.36% composition. In order to be able to show a better comparability between the recipes and efficacies, the converted data were, for recipe 12, stated as 100 g of concentrate and accordingly 3% test concentrations.

Recipe 14 involved a native pH of 0.86; recipe 15 involved a native pH of 1.57. In order to minimize any influence on efficacy by deviating pH values, the pH values were adjusted here by addition of KOH(50%) to pH 2.25 and pH 2.31, respectively. In the case of recipe 14, the necessary amount of for this pH was 1 g of KOH(50%); in the case of recipe 15, this was just 0.8 g. The corresponding amount of demineralized water was substituted in order to continue to have 100 g of recipes. In order to be able to present a better comparability in the overview, the recipe overview lists, however, the amount as water, with a pH regulator being noted.

The results of Example 3 and Example 1 show that substitution of 15% lactic acid with 15% propionic acid can achieve a significant increase in efficacy on *Candida albicans*. What is crucial here is that, as a result of this substitution, altogether four acids are used and no longer just three, though instead in higher amounts. This is also confirmed by Examples 6 and 7:

The addition of 15% acetic acid significantly increases efficacy again, as shown by the comparison of the efficacy data of the *Candida albicans* screening. This increase in efficacy is unexpected for a person skilled in the art and confirms the synergism, since Comparative Example V6, a significantly higher concentration of acetic acid in application solution, exhibits no efficacy with respect to *Candida albicans* even at a relatively long exposure time.

The comparison of Example 14 and Example 8 demonstrates that the efficacy synergism with four acids leads to an even better pathogen reduction than three acids. What is involved here is a comparable composition differing only in a proportion of 6% sodium benzoate or 6% water. Recipe 8, which is based on four acids as active ingredients, achieves the maximum reduction (RF>7) on *Mycobacterium terrae* and *Staphylococcus aureus* within an exposure time of 15 minutes at 3% application concentration. By contrast, recipe 14 exhibits at this low concentration "merely" a reduction factor of 4.95 on *Mycobacterium terrae* and insufficient efficacy on *Staphylococcus aureus* (RF<5.0).

A comparison of recipe 7 with recipe 15 with efficacy data on *Candida albicans* and *Staphylococcus aureus* confirms the finding presented above.

Thus, the difference between the two recipes is merely the 6% benzoate and the resulting reduction factors of recipe 7 containing acetic acid, propionic acid, lactic acid and sodium benzoate are significantly better than those of recipe 15 containing acetic acid, propionic acid and lactic acid.

Although the acetic acid in Example 1 is, in comparison with Example 7, increased from 15% to 44%, the absence of the 15% propionic acid appears to have the greater negative influence on the efficacy with respect to *Candida albicans*. Moreover, the propionic acid brings about a positive influence on solubility, as already described under "Preparation of the concentrates and application dilutions".

The results of Example 1, 8 and 9 show that, moreover, the combinations of the acids used can achieve a sufficient efficacy against *Mycobacterium terrae*.

Comparative Example V9 merely contains 15% propionic acid and acetic acid and exhibits, only as 5% solution, a sufficient efficacy with respect to *S. aureus* after 45 minutes and, up to 5%, no efficacy on *Candida albicans* 45 minutes. Recipe 13 corresponds to the composition of Comparative Example V9; however, 6% water was replaced here by tartaric acid. The direct comparison of Example 13 with V9 on *Staphylococcus aureus* shows an increase in efficacy due to addition of tartaric acid to the existing combination.

The recipe of V9 containing the two acids acetic acid and propionic acid can, however, also be compared well with Comparative Example V2: recipe V2, consisting of 15% propionic acid and 6% sodium benzoate, exhibits absolutely no efficacy with respect to *S. aureus* at 5% concentration and exposure time of 45 minutes, but a sufficient efficacy with respect to *Candida albicans* from 4% and 30 minutes. If, then, these recipes, V9 and V2, are combined to form 15% propionic acid, 15% acetic acid and 6% sodium benzoate, corresponding to Example 10, a significant increase in efficacy with respect to *S. aureus* is surprisingly found, according to which just a 3% application dilution after an exposure time of 45 minutes, or a 4% application dilution after 15 minutes, leads to a reduction factor of RF>7.0. This improvement is highly unexpected on the basis of the individual results.

In this connection, it is also surprising that an increase in the content of sodium benzoate from 6% to 13% in the presence of 15% propionic acid leads to a distinct increase in efficacy with respect to *Staphylococcus aureus*.

Example 9, which already achieves a maximum pathogen reduction on *Staphylococcus aureus* after an exposure time of 5 minutes, demonstrates that increasing the test concentrations can also achieve distinctly faster exposure times. Furthermore, recipe 16, consisting of 15% acetic acid and 15% propionic acid and 13% sodium benzoate, shows that a 5.5% application concentration can already achieve, after an exposure time of 2 minutes, sufficient efficacy with respect to *Candida albicans* and *Staphylococcus aureus*. Moreover, this recipe shows that, as a result of the use of the corresponding acid salts, a good regulation of pH can be used and the antimicrobial efficacy nevertheless remains unchanged.

CONCLUSION

It was possible to show that synergic compositions containing organic acids are possible, with the best antimicrobial efficacies being obtained in the case of compositions containing at least three components.

On the basis of the cited literature, it was not evident to a person skilled in the art that it is possible using the stated acids and concentrations to prepare comprehensively and sufficiently effective disinfectants. What is particularly surprising here is the efficacy against the pathogens which are in many cases limiting in disinfectants: *Mycobacterium terrae*, *Candida albicans* and *Staphylococcus aureus*.

The invention claimed is:

1. An anti-bacterial and/or anti-yeast disinfectant for the disinfection of bacteria and/or yeast on inanimate surfaces, which disinfectant consists of:
   0.1-10% by weight of acetic acid, propionic acid, tartaric acid, and sodium benzoate,
   water, and
   optionally solubilizers selected from glycols, glycol ethers or a mixture thereof,
   wherein the specified amounts are based in each case on the total amount of the disinfectant, and
   wherein the disinfectant is effective as an anti-bacterial disinfectant against at least one bacteria and/or is effective as an anti-yeast disinfectant against at least one yeast.

2. The disinfectant of claim 1, which has a pH of 1.0 to 7.0.

3. The disinfectant of claim 2, which has a pH of 2.0 to 6.0.

4. An anti-bacterial and/or anti-yeast disinfectant for the disinfection of bacteria and/or yeast on inanimate surfaces, which disinfectant consists of:
   (a) 0.1-10% by weight of at least one organic acid selected from acetic acid, propionic acid, or a combination of these,
   (b) 0.01-1% by weight of lactic acid,
   (c) 0.01-10% by weight of sodium benzoate,
   (d) 0-2% by weight of solubilizer selected from hexyl carbitol, propylene glycol, methyl carbitol, butyl carbitol, monoethylene glycol, or a combination of these, and
   (e) water,
      wherein the components add up to 100% by weight and wherein the sum of (a)+(b) is ≤1% by weight when (b)≠0 or the sum of (a)+(b) is >0.1% by weight.

5. The disinfectant of claim 4, wherein the solubilizer is hexyl carbitol and/or propylene glycol.

6. The disinfectant of claim 1, which is an aqueous application solution containing 0.1 to 10% by weight of a disinfectant concentrate and water.

7. The disinfectant of claim 6, wherein the disinfectant is an aqueous application solution containing 0.5 to 8.0% by weight of a disinfectant concentrate and water.

8. The disinfectant of claim 6, wherein the disinfectant is an aqueous application solution containing 2.0 to 6.0% by weight of a disinfectant concentrate and water.

9. A disinfectant concentrate for the preparation of a disinfectant of claim 1, characterized in that the amount of each individual organic acid in the concentrate is not more than 50% by weight, and the total amount of acids is not more than 85% by weight.

10. A disinfectant concentrate, which consists of:
    0.1-15% by weight of lactic acid,
    0.1-50% by weight of acetic acid, and
    0.1-50% by weight of propionic acid,
    wherein the sum of acetic acid and propionic acid is between 15% by weight and 60% by weight,
    optionally 0.1-25% by weight of sodium benzoate,
    optionally 0.1-6% by weight of tartaric acid,
    optionally 0.1-15% by weight of sodium acetate,
    optionally solvent, and
    optionally auxiliaries selected from: pH regulators, corrosion inhibitors, solubilizers, surfactants, dyes, fragrances, and complexing agents, wherein the components of the concentrate add up to 100% by weight and the total amount of acids is at least 21% by weight.

11. A disinfectant concentrate which consists of:
- 21-85% by weight of at least three organic acids selected from (a) 0.1-50% by weight of acetic acid, (b) 0.1-50% by weight of propionic acid, (c) 0.1-6% by weight of tartaric acid, (d) 0.1-30% by weight of lactic acid, and (e) 0.1-15% by weight of salt of benzoic acid,
- 2-20% by weight of solubilizer comprising hexyl carbitol, propylene glycol, methyl carbitol, butyl carbitol, monoethylene glycol or a combination of these, and
- water,
wherein the components add up to 100% by weight.

12. A support material, which has been presoaked with a disinfectant of claim 1.

13. The support material of claim 12, which support material is cloth.

14. The disinfectant of claim 1, wherein at least one bacteria is mycobacteria.

15. The disinfectant of claim 1, wherein the disinfectant is effective as an anti-bacterial disinfectant against a mycobacteria, and against at least one of *Staphylococcus aureus, Escherichia coli, Pseudomonas aeruginosa*, or *Enterococcus hirae*.

16. The disinfectant of claim 15, wherein the disinfectant is further effective as an anti-yeast disinfectant against at least one yeast.

17. The disinfectant of claim 1, which is anti-mycobacterial for the disinfection of mycobacteria on inanimate surfaces.

18. An anti-bacterial and/or anti-yeast disinfectant for the disinfection of bacteria and/or yeast on inanimate surfaces, which disinfectant consists of
- 0.1-10% by weight of at least two organic acids selected from acetic acid, propionic acid, lactic acid and tartaric acid or a combination of these,
- 0.1-10% by weight of sodium benzoate,
- auxiliaries, and
- water,
wherein the components add up to 100% by weight,
wherein the specified amounts are based in each case on the total amount of the disinfectant, and
wherein the disinfectant is effective as an anti-bacterial disinfectant against at least one bacteria and/or is effective as an anti-yeast disinfectant against at least one yeast.

19. A method for disinfecting inanimate surfaces by killing microbials selected from the group consisting of *Staphylococcus aureus, Mycobacterium terrae, Mycobacterium avium, Escherichia coli, Pseudomonas aeruginosa, Enterococcus hirae*, and *Candida albicans*, comprising:
- applying to an inanimate surface a disinfectant or a disinfectant concentrate, and
- allowing the disinfectant or disinfectant concentrate a minimum of 15 minutes to kill the microbials and effect at least a log 4 reduction of the presence of living microbials, as measured in accordance with the "Standardmethoden der DGHM zur Prüfung chemischer Desinfektionsverfahren," which is translated as Standard methods of the German Society for Hygiene and Microbiology for testing chemical disinfection methods, in the quantitative suspension test,
wherein the disinfectant consists of:
- 0.1-10% by weight of at least two organic acids selected from acetic acid, propionic acid, lactic acid and tartaric acid or a combination of these,
- 0.1-10% by weight of sodium benzoate,
- water, and
- optionally solubilizers selected from glycols, glycol ethers, or a mixture thereof,
wherein the specified amounts are based in each case on the total amount of the disinfectant,
wherein the disinfectant is effective as an anti-bacterial and/or anti-yeast disinfectant, and
wherein the disinfectant concentrate is the disinfectant characterized in that the amount of each individual organic acid in the concentrate is not more than 50% by weight, and the total amount of acids is not more than 85% by weight.

20. The method of claim 19 to disinfect yeast on inanimate surfaces, characterized in that the disinfectant or the disinfectant concentrate brings about at least a log 4 reduction with respect to *Candida albicans* within 2 minutes in accordance with the "Standardmethoden der DGHM zur Prüfung chemischer Desinfektionsverfahren," which is translated as Standard methods of the German Society for Hygiene and Microbiology for testing chemical disinfection methods in the quantitative suspension test.

21. The method of claim 19 to disinfect the bacteria *Staphylococcus aureus* on inanimate surfaces, characterized in that the disinfectant or the disinfectant concentrate brings about at least a log 5 reduction with respect to *Staphylococcus aureus* within 2 minutes in accordance with the "Standardmethoden der DGHM zur Prüfung chemischer Desinfektionsverfahren," which is translated as Standard methods of the German Society for Hygiene and Microbiology for testing chemical disinfection methods, in the quantitative suspension test.

22. The method of claim 19 to disinfect *Mycobacterium terrae* on inanimate surfaces, characterized in that the disinfectant or the disinfectant concentrate brings about at least a log 4 reduction with respect to *Mycobacterium terrae* within 15 minutes in accordance with the "Standardmethoden der DGHM zur Prüfung chemischer Desinfektionsverfahren," which is translated as Standard methods of the German Society for Hygiene and Microbiology for testing chemical disinfection methods, in the quantitative suspension test.

* * * * *